Jan. 12, 1926.
J. TEMPLE
METAL CUTTING MACHINE
Filed March 2, 1925
1,569,154
2 Sheets-Sheet 2
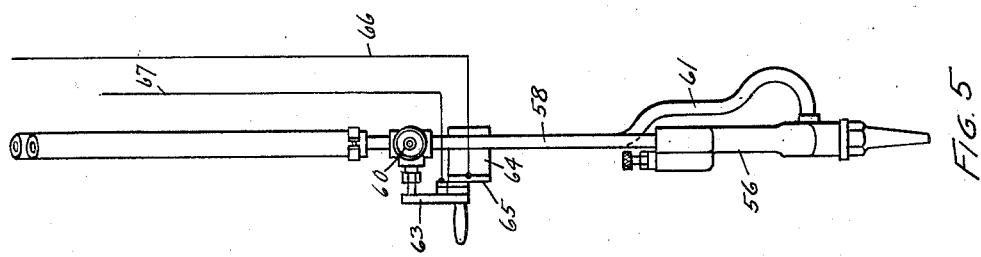
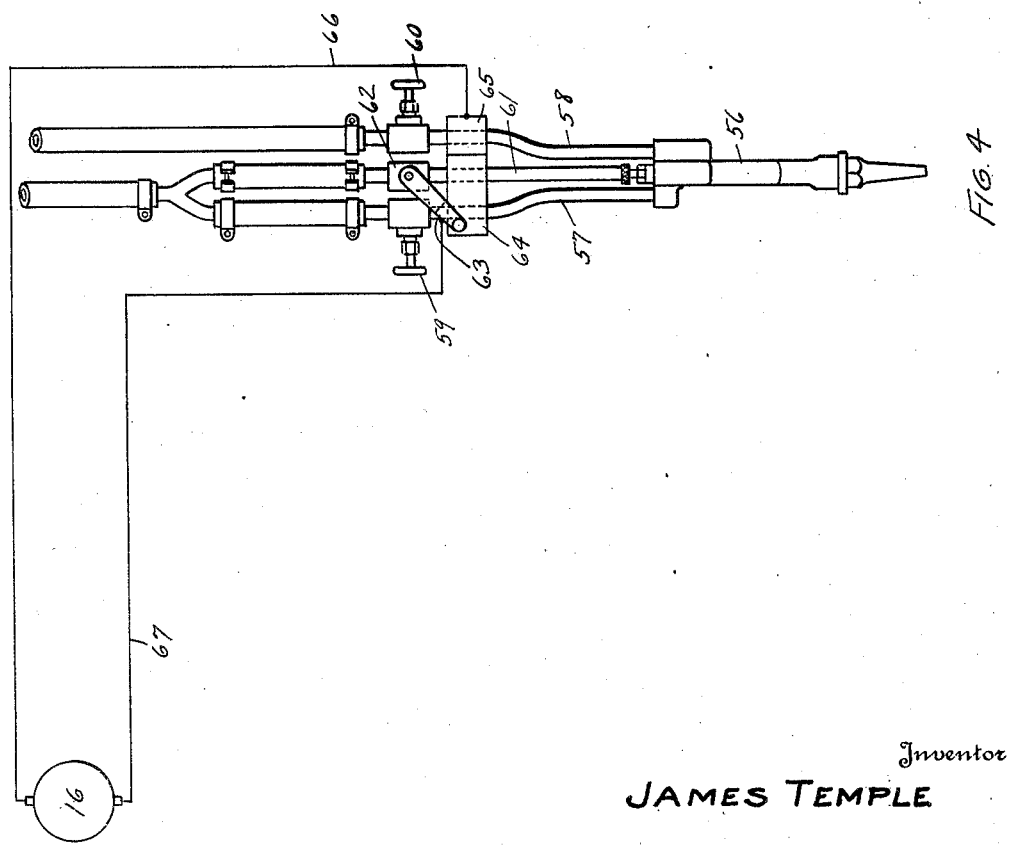
Inventor
JAMES TEMPLE
Attorney Patented Jan. 12, 1926.

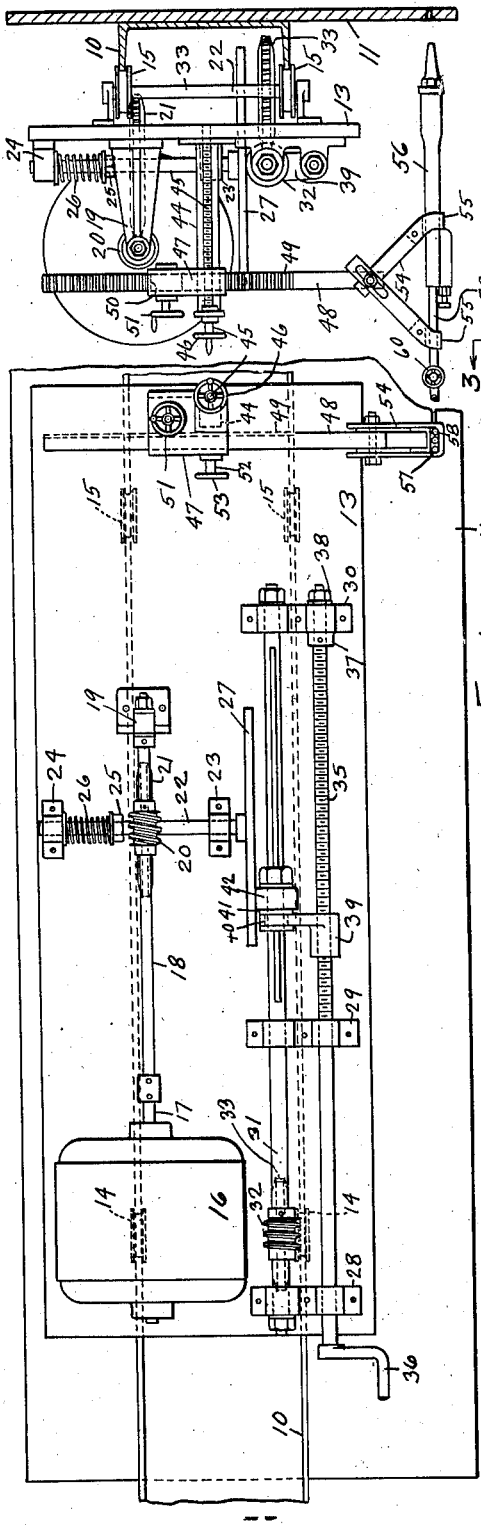

1,569,154

UNITED STATES PATENT OFFICE.

JAMES TEMPLE, OF PORTLAND, OREGON.

METAL-CUTTING MACHINE.

Application filed March 2, 1925. Serial No. 12,803.

*To all whom it may concern:*

Be it hereby known that I, JAMES TEMPLE, a citizen of the United States, and a resident of Portland, in the county of Multnomah and State of Oregon, have invented a new and useful Metal-Cutting Machine, of which the following is a specification.

This invention relates generally to the art of cutting metals with the use of a gas torch, and particularly to a machine for accomplishing this purpose.

The objects of this invention are to produce an exceedingly simple and efficient, as well as light, cutting machine in which the eye strain always present when torches are used by hand is entirely eliminated.

The second object is to save time by eliminating the strains on eyes and muscles which ordinarily require the operator to stop cutting at frequent intervals in order to rest.

The third object is to cut metals along extremely straight, smooth and narrow lines in order that the plates so cut can be joined without further dressing in a planer or other machine.

The fourth object is to reduce the amount of gas consumed, since the cut is made in an exceedingly straight and narrow line permitting the use of a smaller tip than is required for hand-held torches, and also by reducing the number of stops made in a given length of cut.

The fifth object is to so accurately and smoothly cut the edges of a plate that no further trimming will be required, and to so reduce the amount of burr formed that its removal will be a comparatively easy task.

The sixth object is to provide a means for varying the cutting speed to correspond with the job being handled, as well as to suit the varying cutting resistance of a given plate without stopping the motor, and also to enable the cut to be made in three directions— that is, forward or backward or perpendicular thereto.

The seventh object is to make the control for the feed automatic, as far as starting after cutting has begun and stopping the machine before the cutting has stopped.

The eighth object is to combine the cutting gas control with the motor control.

These results are obtained in the manner set forth in the following specification as illustrated in the accompanying drawings, in which:—

Figure 1 is a plan of the device of which Figure 2 is a front elevation with the torch removed and Figure 3 is a vertical section taken along the line 3—3 in Figure 2. Figure 4 is an enlarged front elevation of the torch showing the motor control in diagram. Figure 5 is an end elevation of Figure 4.

Similar numbers of reference refer to the same parts throughout the several views.

Referring in detail to the drawings, the device is mounted on a channel iron track 10 which acts as a straight edge which ordinarily rests on the plate 11, which is being cut. The plate 11 is, for the sake of illustration, placed across the horses 12. On the track 10 is placed a carriage having a bed 13 and wheels 14 and 15. On the bed 13 is placed a motor 16 whose shaft 17 is coupled to the worm shaft 18 supported at its outer end by the bearing 19. The worm 20 meshes with the worm wheel 21 on the transverse shaft 22 which journals in the bearings 23 and 24. On the shaft 22 is placed a collar 25. A spring 26 is placed between the collar 25 and the bearing 24. A friction disk 27 is mounted on the end of the shaft 22.

On the bed 13 are secured the standards 28, 29 and 30 which carry the splined shaft 31 and its worm 32 which meshes with the worm wheel 33 on the axle 34 secured in the wheels 14. A feed screw 35 is also carried by the standards 28, 29 and 30 and is provided with a crank 36, a collar 37 and a nut 38. On the feed screw 35 is placed a tapped arm 39 having a fork 40 which engages the grooved hub 41 of the friction wheel 42 which engages the disk 27.

On the bed 13 is also mounted a vertical guide 44 provided with a feed screw 45 having a hand wheel 46. Upon the guide 44 is placed a slide 47. Through the slide 47 is slidably placed an arm 48 having a rack 49 formed thereon. A pinion 50 meshes with the rack 49 and is rotated by means of the hand wheel 51 which is mounted in the slide 47. The clamping screw 52 for the arm 48 is provided with a hand wheel 53.

On the outer end of the arm 48 is pivotally attached a pair of arms 54 through whose spaced ends 55 are placed the pipes of the cutting torch 56.

It must be understood that this torch may be of any desired type suitable for the purpose, and may be either the oxy-acetylene torch or the oxyhydrogen torch. In this case we have illustrated the usual acteylene and oxygen heating pipes 57 and 58 which are provided with the usual regulating valves 59 and 60. The cutting oxygen pipe 61 is provided with a cock 62 whose lever 63 sweeps across the insulated bracket 64 bearing a spring plate 65 electrically connected with a terminal on the motor 16 by means of the wire 66. The lever 63 is connected by means of the wire 67 to the opposite motor terminal.

The operation of the device is as follows: When employing same to cut off a piece of plate the carriage is moved by hand to the starting position at the edge of the plate upon which the track is carefully placed parallel to the line of a cut about to be made. The pre-heating flame is now applied and the torch tip brought to the correct position relative to the plate, under the control of the screw 45.

As soon as the metal starts to flow the lever 63 is moved to admit the cutting oxygen to the tip and further movement of the lever will close the motor circuit through the plate 65. The motor now drives the carriage forward at a speed depending upon the position of the friction wheel 42 with relation to the disk 27. This speed is made as high as possible consistent with good cutting by manipulating the crank 36. Passing the center of the disk 27 naturally reverses the carriage.

If it is desired to finish the cut at right angles to the line just taken, the lever 63 is moved away from the plate 65 but not sufficiently far to stop the flow of cutting oxygen. The hand feed wheel 51 is then used to move the torch in the desired direction.

If it is desired to bevel the edge of the plate while cutting it is only necessary to incline the torch on its pivot on the arm 48 and proceed as before. The bevel, of course, can be made in either direction, that is, to or from the track.

It is evident that when once the track is placed parallel to the line to be cut and the cut is started that the operator need only concern himself with adjusting the feed of the carriage to the maximum consistent with good cutting. All of the labor and strain, with possible injury to the eye of the operator, is eliminated.

In many instances beveled edges are required which under the hand system is attained by first cutting the plate off with the torch and then beveling the edge in a planer. Owing to the fact that it is possible to make a cut with this machine as smooth as can be made with a planer, it is evident that one need only to turn the flame to the proper angle to secure the desired bevel.

It is also evident that a variable speed motor can be employed instead of the sliding friction device, and that instead of the channel iron track being employed a curved track may be constructed to fit a particular shape of plate it is desired to cut, or the track may be dispensed with entirely and the carriage guided in a circular path by the use of a radius rod, the use of which is well understood by the ordinary mechanic.

These, and other minor changes, can readily be effected without departing from the spirit of my invention.

I am aware that large and expensive forms of cutting machines have been constructed in the past. I therefore do not intend to cover such forms of machines broadly but I do intend to cover all such forms and modifications as fall fairly within the appended claim.

I claim:

A carriage for metal cutting machines having in combination a wheeled frame; a motor on said frame; a worm shaft extending from the shaft of said motor; a worm on said worm shaft; a spring-urged slideable transverse shaft mounted on said frame; a worm wheel on said transverse shaft meshing with said worm; a friction disk on said transverse shaft; a splined shaft mounted on said frame alongside of said disk; a friction pinion on the spline of said splined shaft; a feed screw for moving said pinion along the face of said disk; means for rotating said screw and driving gears between said splined shaft and the wheels of said frame.

JAMES TEMPLE.